US009828685B2

(12) United States Patent
Rømer et al.

(10) Patent No.: US 9,828,685 B2
(45) Date of Patent: Nov. 28, 2017

(54) COMPOSITE FLOW PLATE FOR ELECTROLYTIC CELL

(71) Applicant: EWII FUEL CELLS A/S, Odense SØ (DK)

(72) Inventors: Carsten Henneberg Rømer, Svendborg (DK); Jørgen Schjerning Lundsgaard, Svendborg (DK); Per Wittenhoff, Gudbjerg (DK); David Morgan Thomas, Spjald (DK)

(73) Assignee: EWII FUEL CELLS A/S, Odense So (DK)

( * ) Notice: Subject to any disclaimer, the term of this patent is extended or adjusted under 35 U.S.C. 154(b) by 4 days.

(21) Appl. No.: 14/765,523

(22) PCT Filed: Feb. 10, 2014

(86) PCT No.: PCT/EP2014/052540
§ 371 (c)(1),
(2) Date: Aug. 3, 2015

(87) PCT Pub. No.: WO2014/122304
PCT Pub. Date: Aug. 14, 2014

(65) Prior Publication Data
US 2016/0002798 A1    Jan. 7, 2016

Related U.S. Application Data

(60) Provisional application No. 61/762,593, filed on Feb. 8, 2013.

(51) Int. Cl.
C25B 9/18      (2006.01)
C25B 15/08     (2006.01)
(Continued)

(52) U.S. Cl.
CPC ............... *C25B 9/18* (2013.01); *C25B 1/08* (2013.01); *C25B 9/04* (2013.01); *C25B 9/066* (2013.01);
(Continued)

(58) Field of Classification Search
None
See application file for complete search history.

(56) References Cited

U.S. PATENT DOCUMENTS 4,214,969 A      7/1980   Lawrance
5,252,410 A *   10/1993   Wilkinson ............ H01M 4/86
                                                          429/438

(Continued)

FOREIGN PATENT DOCUMENTS

EP      1 726 060        9/2005
WO      WO 01/48852      7/2001
WO      WO 2005/086273   9/2005

OTHER PUBLICATIONS

International Search Report, PCT/EP2014/052540, dated Apr. 22, 2014, 4 pages.
(Continued)

*Primary Examiner* — Harry D Wilkins, III
(74) *Attorney, Agent, or Firm* — Licata & Tyrrell P.C.

(57) ABSTRACT

A flow plate for use as an anode current collector in an electrolytic cell for the production of hydrogen from water is provided. The flow plate comprises a channel plate and a cover plate. A front face of the channel plate is provided with a flow field pattern of open-faced channels defined by depressed portions alternating with elevated portions. The cover plate made of a material that is corrosion resistant in an anodic environment of water electrolysis. The cover plate is arranged parallel on top of the channel plate and in electrical contact with the front face thereof. The cover plate is further provided with a pattern of through-going apertures
(Continued)

alternating with closed portions, and the closed portions cover at least the elevated portions of the channel plate.

13 Claims, 5 Drawing Sheets

(51) Int. Cl.
| | |
|---|---|
| C25B 1/08 | (2006.01) |
| C25B 9/04 | (2006.01) |
| C25B 9/06 | (2006.01) |
| C25B 9/20 | (2006.01) |
| C25B 9/08 | (2006.01) |
| C25B 11/02 | (2006.01) |
| H01M 8/0206 | (2016.01) |
| H01M 8/021 | (2016.01) |
| H01M 8/026 | (2016.01) |

(52) U.S. Cl.
CPC ............... *C25B 9/08* (2013.01); *C25B 9/206* (2013.01); *C25B 11/02* (2013.01); *C25B 15/08* (2013.01); *H01M 8/021* (2013.01); *H01M 8/0206* (2013.01); *H01M 8/026* (2013.01); *Y02E 60/366* (2013.01)

(56) References Cited

U.S. PATENT DOCUMENTS

| | | | | |
|---|---|---|---|---|
| 5,503,944 | A | * | 4/1996 | Meyer ............... H01M 8/04029 429/437 |
| 7,615,308 | B2 | | 11/2009 | Frederiksen |
| 2001/0049044 | A1 | | 12/2001 | Molter |
| 2004/0121122 | A1 | * | 6/2004 | Reynolds, III ...... H01M 8/0234 428/137 |
| 2004/0197630 | A1 | * | 10/2004 | Wilson ................ H01M 8/0234 429/457 |
| 2006/0199061 | A1 | * | 9/2006 | Fiebig ................. H01M 4/8605 429/410 |
| 2007/0015035 | A1 | | 1/2007 | Izenson |
| 2010/0178580 | A1 | | 7/2010 | Connor |

OTHER PUBLICATIONS

Written Opinion of the International Searching Authority, PCT/EP2014/052540, dated Apr. 22, 2014, 7 pages.

* cited by examiner

COMPOSITE FLOW PLATE FOR ELECTROLYTIC CELL

CROSS-REFERENCE TO RELATED APPLICATIONS

This application is a U.S. National Stage of International Application No. PCT/EP2014/052540, filed Feb. 10, 2014, which claims the benefit of U.S. Provisional Patent Application No. 61/762,593, filed Feb. 8, 2013, both of which are incorporated herein by reference in their entireties.

TECHNICAL FIELD

The present invention relates in one aspect to a flow plate for use as an anode current collector in an electrolytic cell. In a further aspect, the invention relates to an electrolytic cell. In yet a further aspect, the invention relates to a bipolar separator plate for use as a bipolar current collector in a stacked cell electrolyser, and in yet a further aspect, the invention relates to a stacked cell electrolyser. More particularly, the flow plate, the bipolar separator plate, the electrolytic cell, and the stacked cell electrolyser are for the production of hydrogen from water by electrolysis.

BACKGROUND OF THE INVENTION

Hydrogen is an important element in the replacement of hydrocarbon and carbon based electric power production by sustainable and environmentally appropriate alternative means, for example in hydrogen powered fuel-cells. Hydrogen for this purpose may be produced by utilizing variable energy sources such as atmospheric or photo-voltaic power sources in order to produce and store hydrogen for conversion into power when a demand exists. This removes one of the main objections to installation of alternative renewable power sources, namely that power is often produced at inappropriate times and does not have the availability to conform diurnal power demand variation. Therefore, there has been a large effort in developing technologies to facilitate hydrogen based energy production and storage.

An important element in this hydrogen based energy concept are electrochemical devices that can convert chemical energy stored in hydrogen into electrical energy (hydrogen fuel cells) and, vice versa, convert electric energy into chemical energy for storage by producing hydrogen from water by electrolysis (water electrolyzers).

Solid electrolyte based fuel cells, have matured considerably over the years with respect to providing commercially viable designs and production methods. One aspect of the development has been directed to the design of fuel cell stacks with improved bipolar separator plates functioning as anode/cathode current collectors and as flow plates for handling both cathode side and anode side fluid flow. Such bipolar flow plates may be produced at commercially viable costs, e.g. from carbon/graphite based compression mouldable compounds. For example, EP 1 726 060 B1 discloses a dual function bipolar separator plate for use in a solid polymer electrolyte based fuel cell stack. The bipolar separator plates has on an anterior face an anode flow field, and on a posterior face a cathode flow field. The bipolar separator plate can facilitate transport of reactants and heat to and from the reactive surfaces in order to maintain the electrolytic conversion process and to exhaust the reaction products away. As further discussed in this document, in the context of solid electrolyte technology, separating elements for fuel cells are typically manufactured from conducting carbon composites.

However as mentioned above, a hydrogen based concept of energy production and storage also requires suitable electrolysers for converting electrical energy into chemical energy by producing hydrogen for storage. The hydrogen is stored in gas reservoirs at high pressures, e.g. for later use as a fuel in hydrogen fuel cells. Electrolyser systems therefore comprise means for compressing the hydrogen produced by the electrolyser. In a most preferred configuration, a so-called high pressure electrolyser is adapted to directly produce the hydrogen at high pressures, thus allowing to transferring the hydrogen from the electrolyser exhaust directly to a storage recipient without the need of external compression devices. Thereby the overall efficiency of the energy conversion system is improved.

While the cost for the production of fuel cell stacks have been successfully reduced by the maturing technologies, the same technologies cannot be applied in a straight forward manner to electrolysis devices with solid polymer electrolytes. On the contrary, renewed focus on electrolytic devices for the production of hydrogen from water by electrolysis has revealed numerous challenges for materials used in such electrolysis devices. For example, the anode side environment in a water electrolyser comprises a mixture of oxygen in water, which, under operational conditions of the cell with an applied electrical potential, is highly corrosive for most materials. In particular, the above-mentioned carbon/graphite based flow plates commonly used in PEM fuel cells are not at all suited for this highly corrosive anodic fluid environment. Existing fuel stack designs can therefore usually not be merely operated in a reverse mode in order to achieve water electrolysis. In one approach the carbon/graphite based materials are replaced by corrosion resistant materials, such as titanium. However, this solution is very expensive and not commercially viable on a large scale beyond highly specialised niche applications. Furthermore, shaping of titanium to provide a highly complex three-dimensional patterned flow plate is an expensive and time-consuming task. This adds to the cost and directly contradicts the reduction in cost required for producing a commercially viable device.

U.S. Pat. No. 4,214,969 discloses a bipolar separator plate for a stacked cell water electrolyser. The bipolar separator plate is made of a carbon/graphite based compound and has open-faced channels for the distribution and collection of fluids/gases on both sides of the separator plate. The anode side surface of the bipolar separator plate is sealed by a protective metallic foil. The foil is glued or otherwise applied conform to the surface profile including protruding portions, channel side walls, and the channel bottom. An adequate flow of water through the electrolytic cell may require a certain cross-sectional area of the fluid channels. This could be achieved by widening the channels. However, wide channels of this type would provide insufficient mechanical support for the MEA, in particular in the presence of an elevated cathode side pressure as compared to the anode side pressure. Furthermore, a conform application of a thin metallic foil with thicknesses of about 25 µm on a flow field pattern with a deep and narrow channel profile without puncturing the foil can be a tedious and thus costly task. Furthermore, the disclosed flow field provides an unsatisfactory distribution of water supply over the surface of the MEA resulting in hot spots and/or dry spots affecting the efficiency and lifetime of the electrolytic cells.

Therefore there is a need for an improved electrolytic device for the production of hydrogen from water by electrolysis, which is preferably adapted to be operated at high pressures, which can be operated reliably over a long period of time, and which can be produced at a commercially viable cost.

Object of the present invention is to overcome the above-mentioned disadvantages of known flow plates, or at least provide an alternative.

The object is achieved by a flow plate according to independent claim 1, wherein preferred embodiments are defined by the dependent claims as discussed in the following.

Throughout the application, the term "lateral" refers to directions parallel to a principal plane of a planar element, here of the flow plate, and the term "vertical" refers to directions perpendicular to the plane of the planar element, here of the flow plate. The term "fluid" refers to both gases and liquids or mixtures thereof. The acronym PEM stands for Polymer Electrolyte Membrane, and the acronym MEA stands for Membrane Electrode Assembly.

SUMMARY OF THE INVENTION

According to one aspect of the invention, a flow plate is for use as an anode current collector in an electrolytic cell for the production of hydrogen from water. The flow plate comprises a channel plate, wherein a front face of the channel plate is provided with a flow field pattern of open-faced channels defined by depressed portions alternating with elevated portions, and a cover plate made of a material that is corrosion resistant in an anodic environment of water electrolysis, wherein the cover plate is arranged parallel on top of the channel plate and in electrical contact with the front face thereof, wherein the cover plate is provided with a pattern of through-going apertures alternating with closed portions, wherein the pattern of through-going apertures is aligned with the depressed portions, and wherein the closed portions cover at least the elevated portions of the channel plate.

By providing the flow plate as a composite assembly comprising two parts, namely the channel plate for carrying the fluid flow and the cover plate for coping with the chemically aggressive environment at the anode, a cheap and reliable industrial scale production of the flow plate is achieved while at the same time providing adequate corrosion protection to the flow plate.

The channel plate is a bulk part made from an inexpensive material in which channels can be formed as a three-dimensional surface in a well-controlled and inexpensive process. The elevated portions of the channel plate are in a common plane and define a top plane of the channel plate. The depressed portions form a channel bottom and side walls reaching up to the adjacent elevated portions. The channels are open at the top plane. Thereby, open-faced channels are defined. The channels forming the flow field pattern are connected to feed and drain ports via respective manifolds. The cover plate is adapted to protect the channel plate material from the corrosive environment. The choice of materials for the channel plate is therefore less restricted, and cheaper materials can be used that are more easily shaped to provide a flow field pattern of open-faced channels than the materials used for the cover plate. Examples for such channel plate materials are mouldable carbon/graphite compounds that can be shaped with high precision at an industrial scale at relatively low cost, e.g. by compression moulding. Such materials are routinely used for the production of bipolar separator plates in PEM fuel cells as disclosed in U.S. Pat. No. 7,615,308, but are known not to be sufficiently corrosion resistant when directly exposed to the anodic environment in a PEM-based water-electrolyser. As a further example, the channel plates can be made of conductive carbon composite material with compositions that are commercially available and obtained from Bulk Molding Compounds, 1600 Powis Court West Chicago, Ill. 60185, e.g. vinyl ester bipolar plate material of compression molding grade as specified in the data sheet BMC 940-13905 or BMC 940-14868. Such materials are suited for manufacturing channel plates by conventional compression forming processes.

Within the lateral perimeter of the electrolytic cell, the closed portions of the cover plate rest against the elevated portions and at least cover the elevated portions of the first channel plate. Accordingly the through-going apertures in the cover plate are laterally aligned with underlying channels on the front face of the channel plate. Use of the composite flow plate as a current collector in an electrolytic cell implies that the channel plate and the cover plate are made of electrically conductive materials and are in good electrical contact with each other.

The cover plate may be a relatively thin sheet material that is adapted to withstand the highly corrosive environment on the anode side of a water electrolyser. Examples for such materials are AISI 316 stainless steel, titanium grade 2, titanium alloys grade 7 and 7 H, or similarly corrosion resistant metals. The sheets can have a thickness of less than a 1 mm, e.g. about 0.7 mm or even about 0.5 mm. The thickness of the sheet is determined on the one hand by the interest in reducing material cost, weight and volume by reducing the thickness as much as possible, while on the other hand requirements of mechanical stability may dictate a lower limit for the thickness. Through-going apertures in a thin sheet material may be provided with high precision at an industrial scale at relatively low cost, e.g. by laser cutting or water jet cutting. Since the cover plate is merely a thin sheet material provided with through-going apertures, both the material cost and the fabrication cost for the patterning step are significantly reduced as compared to a depth sensitive three-dimensional shaping of channels in a bulk piece of such materials.

When the composite flow plate is to be used in an electrolytic cell, a front side of the cover plate facing away from the channel plate is to contact the anode side of an MEA via a fluid distribution medium, typically a porous, conductive and corrosion resistant medium, such as titanium felt. Water entering the electrolytic cell through a feed port is distributed by the flow field over the anode side surface of the MEA, thus supplying the electrolytic process with reactant (here water) and providing cooling power to the process. Reaction products and excess reactant, i.e. oxygen and excess water, is removed from the electrolytic cell via the flow field through a drain port. The abundant supply with water has chiefly two purposes, namely ensuring a sufficient supply of water to the electrolysis reaction process and carrying excess heat away with the excess water, thereby cooling the electrolytic cell. Excess heat may e.g. arise from the electrical current passed through the electrolytic cell, due to resistive dissipation of electrical energy. The outflowing fluid also entrains the anode-side reaction products, i.e. the oxygen generated by the electrolysis process at the anode of the MEA.

One of the merits of the present invention is the insight that corrosive attack of the channel plate can effectively be suppressed by covering the elevated portions of the channel plate with a relatively thin sheet of corrosion resistant material and by separating the inner surfaces of the channels, i.e. side walls and channel bottom, that are exposed to the anodic fluid, from the anode by a minimum distance that is adapted to suppress corrosion of the channel plate. For a given electrolytic cell design including a flow plate according to the present invention, the geometry of the channel cross-section and/or of the cover-plate cross-section may thus be adapted to achieve an adequate suppression of corrosive attacks on the channel plate material. For example, for given thicknesses of the cover plate and the fluid distribution medium in an electrolytic cell, this may be achieved by choosing an adequate depth of the channels on the front face of the channel plate. For given thicknesses of the channels and the fluid distribution medium, this may equally be achieved by choosing an adequate thickness of the cover plate. Furthermore, to avoid corrosive attack of the channel side walls, this is preferably achieved by recessing the channel side walls with respect to the edges of the apertures in the cover plate, such that the channel at the top plane is wider than the corresponding aperture in the cover plate.

Further according to one embodiment, the flow field pattern on the channel plate is a system of inter-digitized feed and drain channels, wherein each of the feed channels has an upstream end that is connected to at least one feed port via at least one feed manifold, and has a downstream end that terminates on the channel plate, wherein each of the drain channels has an upstream end that terminates on the channel plate and a downstream end that is connected to at least one drain port via at least one drain manifold, and wherein the apertures in the cover plate are arranged as an inter-digitized pattern of feed and drain apertures corresponding to the inter-digitized pattern of feed and drain channels.

The inter-digitized flow-field pattern promotes a stable flow distribution of reactant fluid along the plane of the active electrolysis zone of the MEA. Thereby supply of reactant fluid and of excess fluid for cooling of the MEA and for humidification of the PEM under operation is improved. Consequently, the uniformity of operational conditions of the electrolysis process over the area of the MEA is improved, resulting in improved efficiency and life time of the electrolyser.

Alongside each of the feed channels are arranged drain channels so as to form an inter-digitized pattern of feed and drain channels. Since both the feed and drain channels terminate on the channel plate, the feed channels can only communicate with the drain channels over the elevated portions. The front face of the channel plate is protected by the cover plate. The cover plate is provided with an inter-digitized pattern of feed and drain apertures corresponding to the inter-digitized pattern of feed and drain channels on the channel plate. The apertures of the cover plate are aligned with the depressed portions defining the feed and drain channels of the channel plate, whereas the elevated portions are covered by the material of the cover plate in the closed portions. The apertures in the cover plate are adapted to provide fluid communication between the underlying channels and the fluid distribution medium in a distributed manner along essentially the whole length of the respective feed and drain channels. A few isolated perforations distributed over the length of the underlying channels, which are spaced apart from each other by long sections of closed portions, tend to leave areas of stagnating flow around and in between the perforations, and are therefore usually not suited for the purpose. In such a "broken line" design of the apertures formed by perforations alternating with supporting bridges across the underlying channels, the apertures should dominate over the bridges as seen along the length of the channels. Preferably, the dimension of any such bridges as seen in a direction along the length of the channels does not exceed the channel width.

When used in an electrolytic cell, a front side of the cover plate facing away from the channel plate is to contact the fluid distribution medium on the anode side of the electrolytic cell. The fluid distribution medium is sandwiched between the flow plate and the MEA. Fluid supplied to the flow plate through the feed port enters the feed channels via the feed manifold at the upstream end; the fluid flows via the feed channel in the channel plate in a lateral direction over the flow plate; the fluid is injected in a vertical direction through the corresponding feed aperture in the cover plate into the fluid distribution medium; Injection occurs in a distributed manner along the length of the feed channel; The fluid passes in a lateral sheet flow through the porous fluid distribution medium to contact the anode, catalyst and the electrolyte, where it undergoes electrolytic processing; Reaction products and excess fluid is collected from the fluid distribution medium in a vertical direction through one or more adjacent drain apertures on either side of the feed aperture in the cover plate to enter the underlying drain channels, from where the excess fluid entraining the reaction products is drained via the drain manifold and the drain port. The inter-digitized flow field thus generates a pattern of forced sheet flows along the surface of the MEA, wherein adjacent sheet flows have opposing directions. Thereby, an abundant supply and improved distribution of reactant to the active zone for electrolysis is achieved with an adequate removal of anode-side reaction products and excess heat.

The flow plate of the present invention is particularly well suited for providing an adequate inter-digitized flow pattern. The width (and depth) of the channels in the channel plate can be adapted with only the coarse volume feed and drain flow requirements in mind. In addition thereto, it is possible to adapt the width of the feed and drain apertures in the cover plate independent of the width and/or depth of the underlying feed and drain channels. Thereby, it is possible to easily adapt the flow plate design in order to optimize the local fine distribution in a controlled sheet flow along the surface of the MEA. By varying the flow plate design, both the injection of reactant fluid from the feed channel into the porous fluid distribution medium and the subsequent collection of the fluid and entrained reaction products from the porous medium into the drain channels can be adjusted.

Further according to one embodiment of the flow plate, the width of the apertures in the cover plate is less than the width of the underlying channels in the channel plate. In the context of this application, the width of the channels refers to the transverse dimension taken across the channel, i.e. in a lateral direction perpendicular to the direction of the channels. Accordingly, the width of a corresponding aperture in the cover plate refers to the transverse dimension of the opening in the cover plate taken across the channel. By providing apertures that are narrower than the underlying channels, the sidewalls of the channels in the channel walls are recessed with respect to the apertures of the cover plate. Besides the above-mentioned advantages of such a channel/aperture geometry, this has the advantage that a wide channel profile is obtained, which is adapted to support a higher fluid throughput and reduces the flow resistance of the channels. Under operation, the pressure drop along the channels is thereby reduced, which results in an improved uniformity of the fluid distribution over the surface of the MEA. At the same time, by keeping the apertures narrow, a good mechanical support of the MEA is maintained. This allows for operation of the electrolytic cell at differential pressures where the cathode side pressure exceeds the anode side pressure, without the MEA sagging into the channels. This is particularly relevant for a high pressure water electrolyser configured to directly produce hydrogen at the cathode side at pressures above 10 bar, preferably above 50 bar, or even above 100 bar while maintaining the anode side at pressures below 10 bar, typically about 5 bar.

Further according to one embodiment of the flow plate, the width of the apertures in the cover plate is less than 0.5 mm, or between 0.1 mm and 0.5 mm or about 0.3 mm. An aperture width of below 0.5 mm, preferably about 0.3 mm is adapted in an electrolytic cell to provide good mechanical support for an MEA and the intermediate fluid distribution medium, in particular also when operating the electrolytic cell at the above-mentioned large differential pressures across the MEA between the cathode side and the anode side.

Further according to one embodiment of the flow plate, the cover plate has a thickness of at least 0.2 mm, or between 0.2 mm and 3 mm, alternatively between 0.3 mm and 2 mm, alternatively between 0.5 mm and 1 mm, or about 0.7 mm. The flow plate is a part of an electrolytic cell, wherein a plurality of these cells are usually assembled in a vertical stack arrangement as further detailed below. The thickness chosen for the cover plate is typically a trade-off between materials cost on the one hand (the thinner the better), and separation of the channel plate material from the anode potential and/or mechanical stability to provide sufficient support to the MEA under differential pressure load on the other hand (the thicker the better). The thickness of the cover plate should be chosen sufficiently thick to suppress corrosive attacks on the channel bottom and side walls by separating the inner channel surfaces from the anode potential by a minimum distance of fluid connection between the anode of the MEA and the channel plate surfaces exposed to the fluid. Furthermore, for a given electrolytic cell design, the thickness chosen for the cover plate has to be sufficient to provide adequate mechanical support of the associated fluid distribution medium and MEA under operational differential pressures, in particular when the side walls of the underlying channel are recessed with respect to the aperture.

Further according to one embodiment of the flow plate, the cover plate is made of stainless steel, titanium, or a titanium alloy. Stainless steel has the advantage that it is cheaper than the other materials, yet showing a useful corrosion resistance. Titanium and titanium alloys are more expensive than stainless steel, but exhibit a higher corrosion resistance than stainless steel. Examples for such cover plate materials include AISI grade 316 stainless steel, and titanium grade 2 that have been found to resist the corrosive environment on the anode side of a PEM-based water electrolyser comprising flow plates according to one embodiment of the invention.

Further according to one embodiment of the flow plate, the channels on the front face have a depth of between 0.3 mm and 1 mm, or about 0.5 mm. The channel depth is measured as the distance of the channel bottom as defined by the depressed portions from the top plane as defined by the elevated portions of the channel plate.

Further according to one embodiment of the flow plate, the channel has at the top plane a width of between 0.3 mm and 3 mm, preferably about 1 mm. The channels may e.g. have a rectangular, trapezoidal, U-shaped, or V-shaped cross-sectional profile. An open channel profile with at least slightly outwardly inclined side walls has the advantage of an improved mould release. A typical channel cross-sectional area may be in the range between 0.1 $mm^2$ and 1 $mm^2$, or e.g. about 0.5 $mm^2$. A flat aspect ratio, where the channel width exceeds the channel depth is typically preferred.

Further according to a preferred embodiment, the flow plate is a bipolar separator plate for use in a stacked cell electrolyser, wherein the cover plate and the front face of the channel plate are the anode current collector, and a rear face of the channel plate is the cathode current collector. The bipolar separator plate is for use in a vertically stacked electrolyser configuration to electrically connect adjacent electrolytic cells in series to each other while separating the cathode side fluid handling and the anode side fluid handling of adjacent electrolytic cells from each other. Each bipolar separator plate has an anode side flow field pattern of channels on the front face, covered with a cover plate as described above, and a cathode side flow field pattern of channels on the rear face.

The flow fields on the anode sides of the stacked cells are supplied in parallel with reactant fluid through the respective anode feed ports on each bipolar separator plate. Excess fluid carrying anodic reaction products and excess heat are drained in parallel through the respective anode drain ports. The flow fields on the cathode sides of the stacked cells collect excess fluid carrying the cathode side reaction products via a cathode side collection port. When operated as a water electrolyser, the reactant fluid is typically purified de-ionized water with conductivity below 20 μS/cm, preferably below 15 μS/cm, further preferably below 10 μS/cm, more preferably in the range between 1-5 μS/cm, or typically between 1-3 μS/cm. The anode side reaction product is oxygen, and the cathode side reaction product is hydrogen.

The bipolar separator plate is thus a composite plate comprising both a channel plate and a cover plate arranged on top of the anode side flow field as described above. The total thickness of the bipolar separator plate is a sum of the channel plate thickness and the anode-side cover plate thickness. The channel plate thickness is a trade-off with respect to the criteria cell/stack-serial resistance, cell/stack-weight and volume on the one hand (the thinner the better), against mechanical stability with respect to differential pressures acting vertically across the bipolar plate on the other hand (the thicker the better). Furthermore, the channel plate has to have a minimum thickness allowing for providing adequate channel depths in both the anode and cathode side flow fields. A typical value for the thickness of a channel plate may be roughly 5 mm.

Further according to one embodiment of the bipolar separator plate, the rear face of the channel plate is provided with a flow field pattern of open-faced channels defined by depressed portions alternating with elevated portions. This cathode side flow field is for collecting hydrogen and water from the cathode side of the MEA. Since there are no particular issues of corrosion for the cathode side, the cathode side flow field may be formed directly on the rear side of the channel plate with no further particular corrosion protection measures required. The channels on the front face and on the rear face may be shaped in the same step, e.g. as mentioned above, by compression moulding of a carbon/graphite based compound.

Further according to one embodiment of the flow plate, the at least one feed manifold and the at least one drain manifold are arranged on opposite portions of the periphery of the channel plate, and the lateral distance between adjacent feed and drain channels in the inter-digitized flow field on the front face of the channel plate is smaller in a centre portion as compared to a peripheral portion of the channel plate. Thereby, the channel density of the inter-digitized flow field pattern on the front face of the channel plate is higher in a centre portion as compared to a peripheral portion of the channel plate.

As mentioned above, in an inter-digitized arrangement of feed and drain channels in fluid communication with a fluid distribution medium, a forced fluid transport is driven from the feed channel via a sheet flow through the fluid distribution medium to the drain channel. The fluid is injected through feed apertures in a distributed manner along the length of the feed channel. Due to hydrodynamic effects, the injection, and thus the flow rate through the fluid distribution medium varies along the length of the feed channel. For example, in a forced sheet flow between parallel and straight channels connected via a porous medium, typically a minimum of the flow rate is observed along the length of the channels midways between the start and end of the injection. By curving the feed and/or drain channels so as to vary the distance between the channels in a manner that they are closer to each other in a middle section as compared to the ends, this effect is countered, thereby improving the uniformity of the generated sheet flow.

According to a broader aspect of the invention, this lateral layout of the inter-digitized flow field pattern is also advantageous in general where an even distribution of the forced sheet flow is desired, e.g. on flow plates for use in fuel cells or electrolysers where the channel plate directly contacts a fluid distribution medium without the intermediate of a cover plate.

Accordingly, an inter-digitized flow field of feed and drain channels, wherein the feed and drain channels communicate with each other via a porous medium and/or a confined sheet flow in a distributed manner along the length of the feed and drain channels, the distance between adjacent feed and drain channels varies along the length of these feed and drain channels. Thereby hydrodynamic effects leading to an uneven flow velocity distribution in the porous medium/sheet flow along the direction of the feed and flow channels may be countered, and an improved uniformity of the flow velocity distribution in the porous medium/sheet flow is achieved.

Advantageously, when the porous medium (or sheet flow) has a uniformly distributed flow resistance, the compensation for the hydrodynamic effects is achieved by varying the distance between the feed and drain channels as follows. Preferably in this embodiment, the distance is a minimum midways between the ends of the feed and drain channels, i.e. the distance between the feed and drain channels gradually increases from the middle in both directions along the feed and drain channels towards the ends of the feed and drain channels.

Further according to one embodiment, the flow plate is generally circular as seen in a vertical direction. The circular shape has advantages of mechanical stability when using the flow plate in a stacked cell electrolyser operating at high pressures.

Advantageously according to a further embodiment of the flow plate with a circular geometry, an array of inter-digitized feed and drain channels is provided. The peripheral feed and drain channels are each connected to respective feed and drain manifolds arranged opposite of each other on either half of the periphery of the flow plate. Following the channels from the end where they are connected to the manifold, the channels extend radially inward towards the centre, but are curved to bend away again such that the channel terminates pointing radially outward, wherein the channels are increasingly bent as their distance from the centre of the circle increases. Adjacent feed and drain channels are thus closest to each other in a middle section than at either end.

In the following an electrolytic cell and a stacked cell electrolyser are disclosed, which comprise flow plates according to any of the above-mentioned embodiments. Accordingly, the same advantages are achieved for these devices as discussed above with respect to the different embodiments of the flow plate.

According to a further aspect of the invention an electrolytic cell for the production of hydrogen from water by electrolysis is provided. The electrolytic cell comprises a planar membrane electrode assembly (MEA) with a polymer electrolyte membrane (PEM) sandwiched between an anode and a cathode; on the anode side: an anode side fluid distribution medium in contact with the anode, and an anode current collector in contact with the anode side fluid distribution medium; and on the cathode side: a cathode side fluid distribution medium in contact with the cathode, and a cathode current collector in contact with the cathode side fluid distribution medium; wherein the anode current collector is a flow plate according to any of the above-mentioned embodiments.

Further according to one embodiment of the electrolytic cell, the anode current collector and the cathode current collector are on respective bipolar separator plates according to any of the above-mentioned embodiments.

According to a further aspect of the invention a stacked cell electrolyser for the production of hydrogen from water by electrolysis is provided. The stacked cell electrolyser is formed as a stack of the above-mentioned electrolytic cells.

BRIEF DESCRIPTION OF THE DRAWINGS

In the following, detailed embodiments of the invention are described with reference to the appended drawings. The drawings show in FIG. 1 schematically, a cross-sectional detail of an electrolytic cell comprising a flow plate according to one embodiment of the invention, FIG. 2 a top view of a channel plate with an inter-digitised flow field pattern layout according to another embodiment of the invention, FIG. 3 a bottom view of a bipolar separator plate according to a further embodiment of the invention, FIG. 4 schematically, a cross-sectional detail of a stacked cell electrolyser with an illustration of the anode side inter-digitized fluid flow, FIG. 5 schematically, a model system used for CFD-simulations of inter-digitized flow, FIG. 6 a graph showing a sheet flow velocity distribution along the x-axis obtained from a CFD-simulation of the model system of FIG. 5, FIG. 7 a top view of a channel plate with an inter-digitised flow field pattern layout according to yet another embodiment of the invention, FIG. 8 a cross-sectional detail of the channel plate along line A-A in FIG. 7, FIG. 9 a top view of a cover plate with an inter-digitised flow field pattern layout corresponding to the channel plate of FIG. 7, and in FIG. 10 a cross-sectional detail of the cover plate along line B-B in FIG. 9.

DETAILED DESCRIPTION OF EMBODIMENTS

Figure 1:
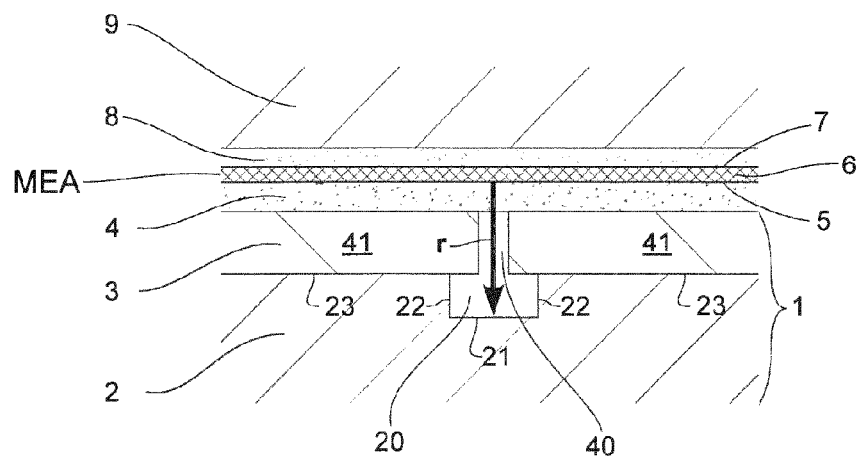

FIG. 1 shows schematically, a cross-sectional detail through a polymer electrolyte membrane (PEM) based electrolytic cell comprising a composite flow plate 1 with a channel plate 2, e.g. made of a conductive carbon/graphite compound, and a cover plate 3, e.g. made of titanium, wherein the cover plate 3 is arranged on top of and in good electrical contact with the channel plate 2. The channel plate 2 has on the front face depressed portions 21 in between elevated portions 23. The depressed portions 21 define open-faced channels 20 with a bottom (the depressed portions 21) and side walls 22 extending from the bottom 21 to the elevated portions 23. The elevated portions 23 are in a common plane and define a top plane of the channel plate 2. The channels 20 are open at the top plane. The cover plate 3 comprises apertures 40 between closed portions 41. The apertures 40 are aligned with the underlying channels 20, wherein the apertures 40 are narrower than the channels 20, such that the side walls 22 of the channel 20 are recessed with respect to the corresponding aperture 40. On the surface facing away from the channel plate 2, the cover plate is in mechanical and electrical contact with an anode side fluid distribution medium 4 made of a porous, conductive, and corrosion resistant material, such as titanium felt. The fluid distribution medium 4 is in mechanical and electrical contact with the anode 5 of a membrane electrode assembly (MEA), wherein the MEA comprises a PEM 6 sandwiched between the anode 5 and a cathode 7. The cathode 7 is contacted by a conductive cathode side fluid distribution medium 8, such as a carbon felt, which is in turn contacted by a cathode plate 9. Under operation a current is passed in a vertical direction through the electrolytic cell, wherein the flow plate 1 acts as anode current collector, and the cathode plate 9 acts as cathode current collector. The channels 20 are designed with an adequate cross-sectional area for the coarse distribution of reactant water over the anode side area of the electrolytic cell through a flow field pattern defined in the channel plate 2. The fluid distribution medium 4 is in fluid communication with the channels 20 through the apertures 20 and handles the fine distribution of the reactant water over the surface of the anode 5 of the MEA. The electrolysis reaction taking place at the anode generates nascent oxygen and results in a highly corrosive environment for carbon based materials, such as the compression mouldable carbon/graphite compounds used for producing the channel plates. The cover plate 3 is made of a material that is corrosion resistant in an anodic environment of water electrolysis, such as titanium, and is designed to protect the underlying channel plate 2 from corrosion. Closed portions 41 of the cover plate 3 cover at least the elevated portions 23 of the channel plate 2, whereas the apertures 40 are aligned with the channels 20. Thereby, of the channel plate 2 only the inner surfaces 21, 22 of channels 20 are exposed to the potentially corrosive anode side fluids. However, in order to avoid corrosion of these surfaces, it is sufficient that the thickness of the cover plate 2 and the depth of the channels 20 with an adequate cross-sectional area is chosen such that the distance r between the anode 5 and the inner surfaces 21, 22 of the channels 20 exceeds a minimum length. Under typical operational conditions for producing hydrogen by water electrolysis in a PEM-based electrolytic cell, potential differences applied between the cathode current collector 9 and the anode current collector 1 are typically between 1.4V and 2.0V. Under these conditions, it has surprisingly turned out that a minimum distance r exceeding 1 mm, or typically about 1.5 mm is sufficient to effectively suppress corrosion of the channel plate 2 material. As an example for successful geometry parameters, the anode side fluid distribution medium has typically a thickness of about 0.3 mm, the cover plate 2 has a thickness of about 0.7 mm, and the channel 20 depth is about 0.5 mm, i.e. the total distance r between anode 5 and channel bottom 21 is about 1.5 mm. In this example, the aperture 40 width is about 0.3 mm, and the channel 20 width is about 1 mm, wherein the apertures 40 are aligned centrally with respect to the channels 20, resulting in a recess of the side walls 22 with respect to the aperture 40 of about 0.3-0.4 mm.

Figures 2, 3:
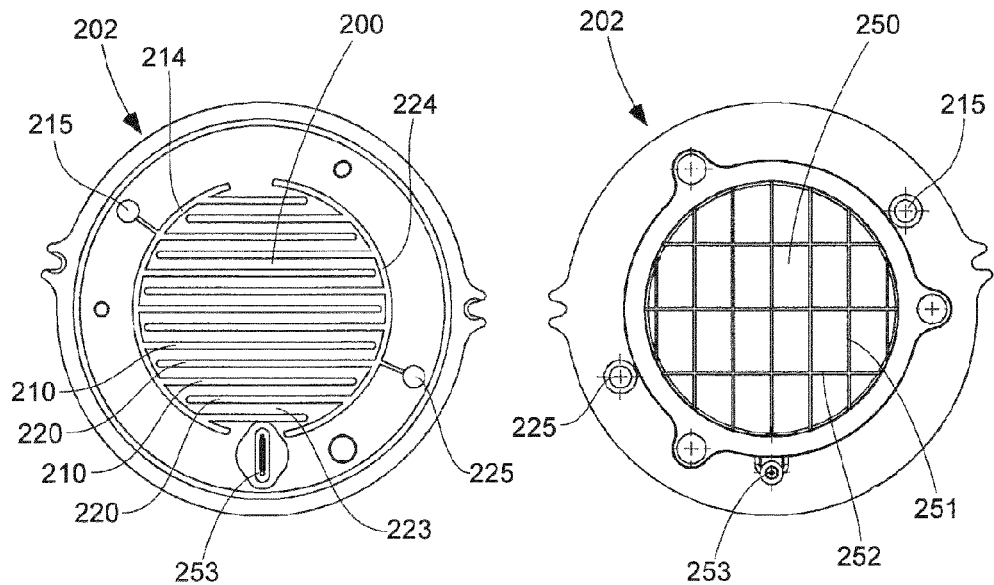

FIG. 2 shows a top view of the front face of a circular channel plate 202 with a flow field pattern 200 having an inter-digitized layout of straight feed channels 210 alternating with straight drain channels 220, such that adjacent feed and drain channels 210, 220 are arranged parallel alongside each other across the surface of the channel plate 202. An upstream end of the feed channels 210 is connected via a feed manifold 214 to a feed port 215. Accordingly, a downstream end of the drain channels 220 is connected via a drain manifold 224 to a drain port 225. The feed and drain manifolds 214, 224 are arranged at the periphery of the channel plate 202, and diametrically opposed to each other. The feed and drain ports 215, 225 are arranged on a rim portion of the channel plate surrounding the flow field pattern 200 and the manifolds 214, 224. The feed and drain channels 210, 220 extend from their respective manifolds 214, 224 across the channel plate 202 towards the opposite manifold 224, 214 and terminate on the channel plate next to the opposite manifolds 224, 214. The feed and drain channels 210, 220 are not connected to each other, but can only communicate through the open face over the elevated portions 223 between the channels 210, 220. The resulting forced inter-digitized flow is further described below with respect to FIG. 4.

FIG. 3 shows a view of the cathode side of a bipolar separator plate with a hydrogen collection flow field 250. The hydrogen collection channels 251, 252 are arranged in a criss-cross pattern and are connected to a hydrogen collection port 253 via a peripheral manifold. The criss-cross pattern is one suitable arrangement of collection channels, but other arrangements may also be conceived. The flow field is to contact a fluid distribution medium on the cathode side of an electrolytic cell as a cathode current collector. The channels 251, 252 collect hydrogen produced at the cathode of the MEA from the fluid distribution medium and direct the hydrogen to the collection port 253 through which it is exhausted for storage or external use. As indicated in FIG. 3, the cathode side flow field 250 may be arranged on the rear face of a channel plate 202, wherein the front face of the channel plate 202 carries an anode side flow field 200, such as that shown in FIG. 2 (or FIG. 7). The hydrogen collection port 253 is arranged in a rim portion, which also carries feed and drain ports 215, 225.

Figure 4:
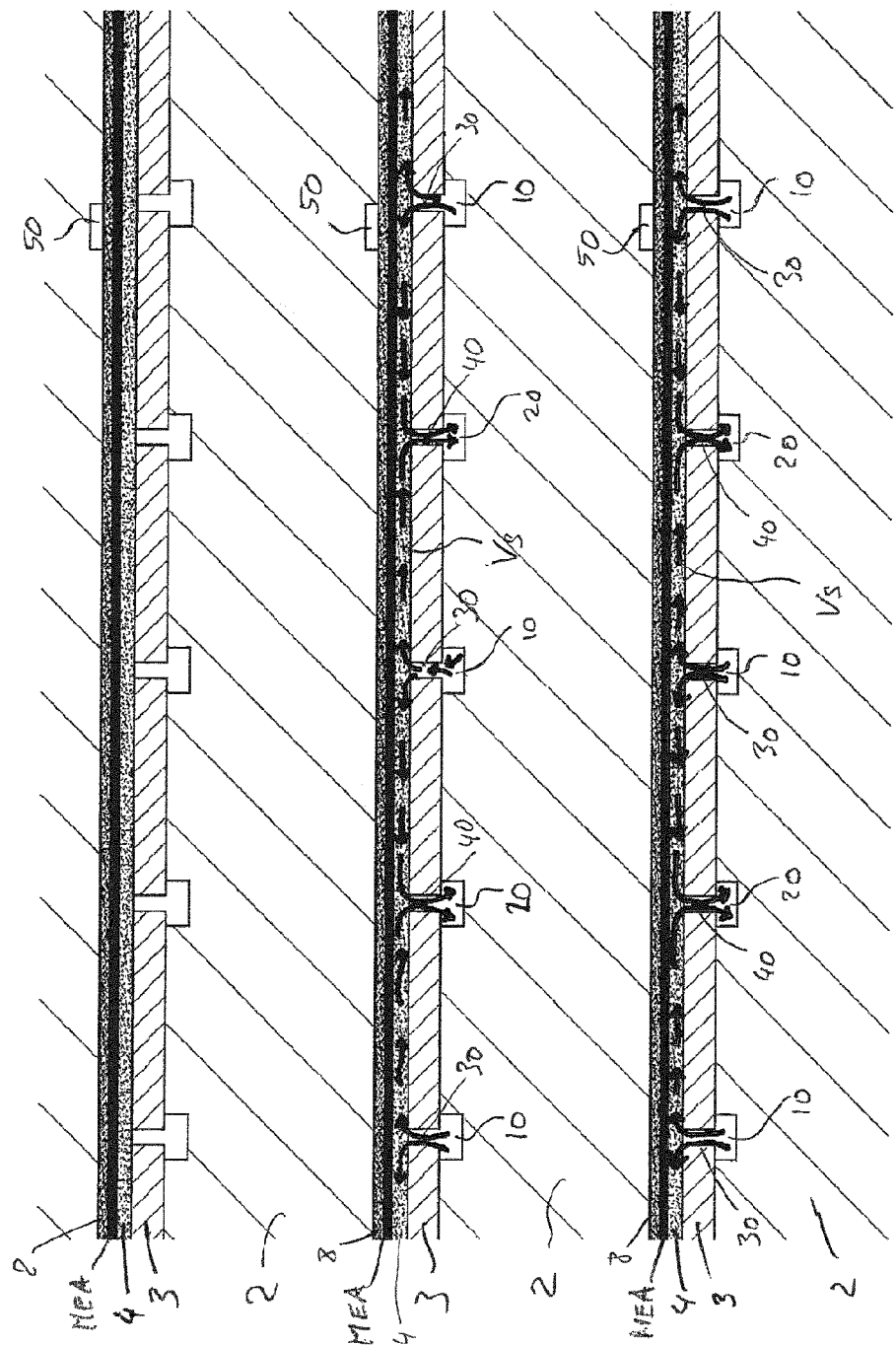

FIG. 4 shows schematically a stacked arrangement of electrolytic cells, wherein each cell comprises an MEA sandwiched between an anode side fluid distribution medium 4 and a cathode side fluid distribution medium 8. The stacked cells are electrically connected in series via the bipolar separator plates 1 which on one side act as a cathode current collector for one cell, and on the opposite side act as an anode current collector for the subsequent cell. At the same time, the bipolar separator plates 1 are flow plates with a cathode side flow field and an anode side flow field.

The flow fields of the cells are separated from each other by the bipolar separator plates 1. The flow fields are connected outside the cells through stack manifolds for transporting reactant water feed, exhaust of anode side fluid and reaction products (water and oxygen), and exhaust of cathode side fluid and reaction products (water and hydrogen). The stack manifolds are advantageously formed in a rim portion of the bipolar plates 1. For example, in the embodiment of FIGS. 2 and 3, stack feed, stack drain and stack collection manifolds may be formed by coupling feed, drain and collection ports 215, 225, 253 together with respective coupling feed, drain and collection ports of the subsequent bipolar separator plates in the stack.

In the cross-sectional detail of the embodiment shown in FIG. 4, the cathode side flow field has collection channels 50 that are arranged to collect hydrogen produced at the cathode of the MEA and excess water occurring on the cathode side of the cell from the cathode side fluid distribution medium 8, and exhaust the hydrogen and the water through a collection port.

The anode side flow field has feed channels 10 and drain channels 20 that are arranged in an inter-digitized, such as the layout described above with respect to FIG. 2. The feed and drain channels 10, 20 are formed on the front face of a channel plate 2, and communicate with the anode side fluid distribution medium 4 through respective feed apertures 30 and drain apertures 40 provided in a cover plate 3, such as the design described above with respect to FIG. 1.

The inter-digitized layout of the feed and drain channels results in a forced flow through the anode side fluid distribution medium 4 as indicated by the small arrows in FIG. 4. Reactant water is supplied to each of the electrolytic cells from a common stack feed manifold through a cell feed port (not shown in FIG. 4); The reactant water enters the feed channels 10 via the cell feed manifold at the upstream end; the reactant water flows via the feed channel 10 in a lateral direction over the channel plate 2; From there, the reactant water is injected in a vertical direction through the corresponding feed aperture 30 in the cover plate 3 into the fluid distribution medium 4; Injection occurs in a distributed manner along the length of the feed channel 10; The injected flow divides into two lateral sheet flows through the porous fluid distribution medium 4 towards the adjacent drain apertures 40 on either side of the feed aperture 30; The sheet flow of reactant water contacts the anode, catalyst, and the electrolyte of the MEA, where it undergoes electrolytic processing; Each of the drain apertures 40 collects reaction products (oxygen) and excess water from two sheet flows originating from feed apertures 30 on either side of the drain aperture 40; The oxygen and excess water leave the fluid distribution medium 4 in a vertical direction through one or more adjacent drain apertures on either side of the feed aperture in the cover plate to enter the underlying drain channels, from where the excess water entraining the oxygen is drained via the drain manifold and the drain port. The inter-digitized flow field thus generates a pattern of forced sheet flows along the surface of the MEA, wherein adjacent sheet flows have opposing directions. Thereby, an abundant supply and improved distribution of reactant water to the active zone for electrolysis is achieved with an adequate removal of anode-side reaction products and excess heat.

Figure 5:
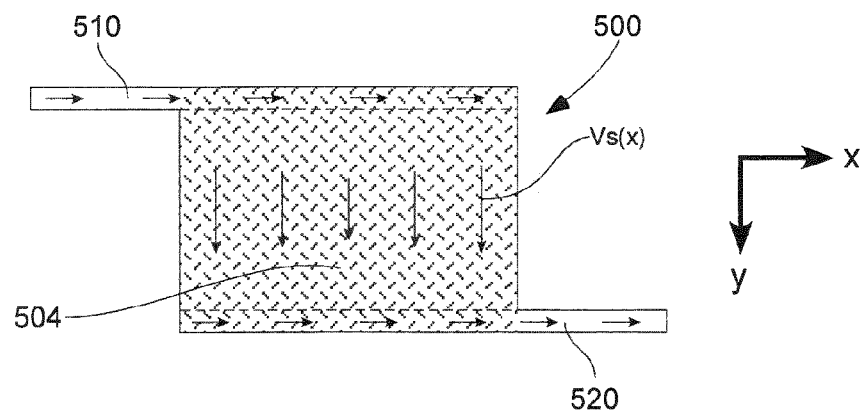
Figure 6:
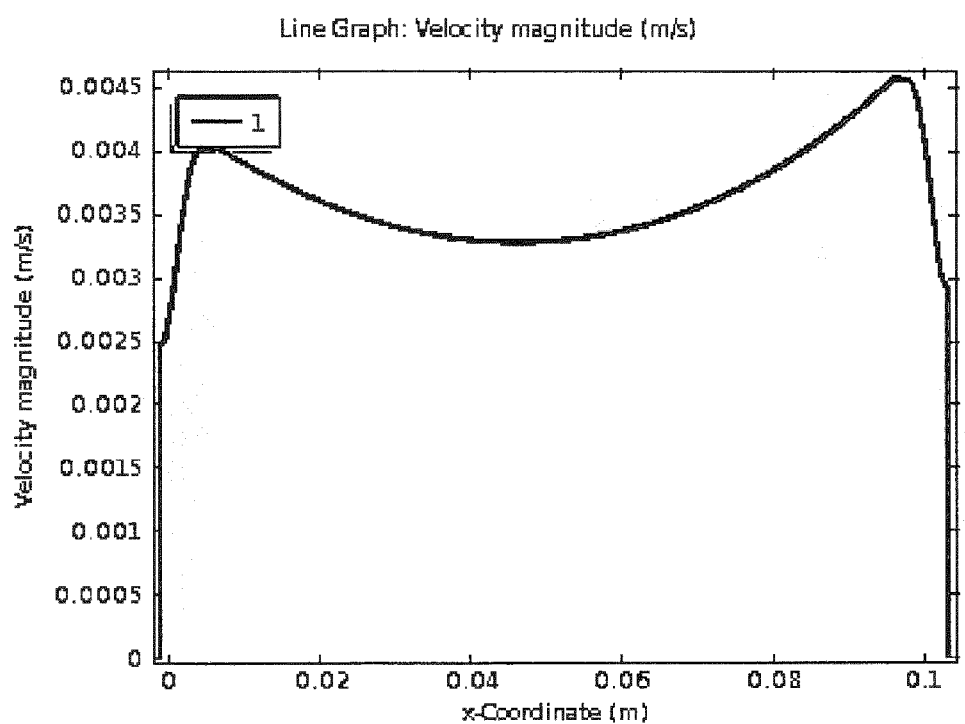

FIG. 5 shows a model system 500, which was used for performing a CFD simulation of the forced sheet flow. The model system 500 comprises a first channel 510, and a second channel 520 arranged at a distance parallel to each other along an x-coordinate direction. On an upstream end, the first channel 510 is connected to a water source. On a downstream end, the first channel 510 is terminated. On an upstream end, the second channel 520 is terminated. On a downstream end, the second channel 520 is connected to a water sink. The two channels 510, 520 are in fluid communication with each other only via a confined layer of a porous medium 504 arranged on top of the channels 510, 520. Simulations were performed using typical geometry parameters occurring in an electrolytic cell of the above-mentioned type. Water originating from the first channel 510 is vertically injected over the whole width of the first channel 510 into the porous layer 504. The water passes in a direction perpendicular to the x-axis, i.e. in a y-coordinate direction, through the porous medium towards the second channel 520, where the water is collected and subsequently transported away to the sink. The CFD-simulation illustrates that the magnitude of the sheet flow velocity Vs in the y-direction varies as a function of the x-coordinate. FIG. 6 shows a graph with the result of a CFD-simulation performed using the model system 500. The graph plots the magnitude of the sheet flow velocity through the porous medium in a direction from the first channel 510 to the second channel 520 as a function of the x-coordinate, Vs(x). A pronounced minimum is observed midways between the two ends. Accordingly, an electrolytic cell, which has an inter-digitized anode side flow field pattern with parallel feed and drain channels may suffer from an uneven distribution of reactant supply and cooling power over the surface of the MEA.

Figure 7:
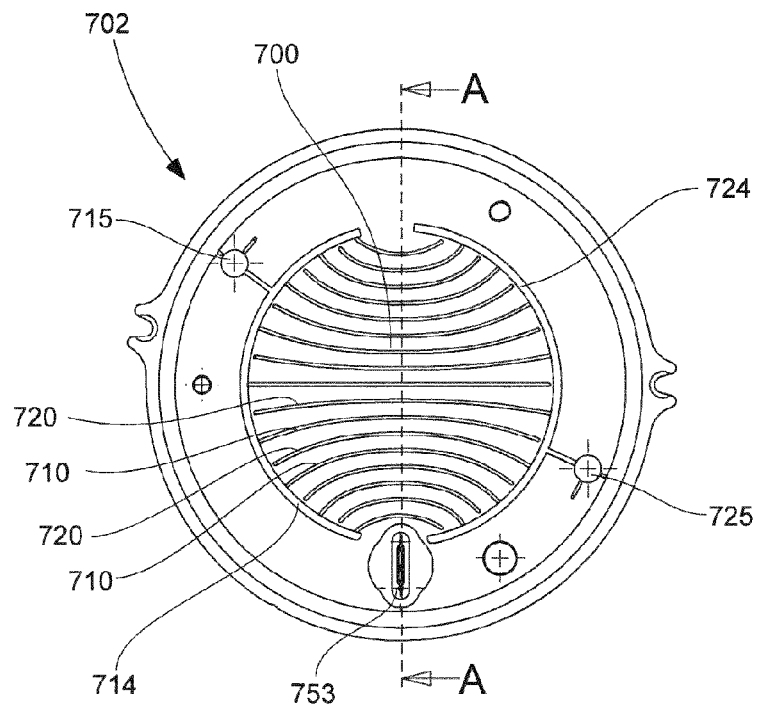
Figure 8:
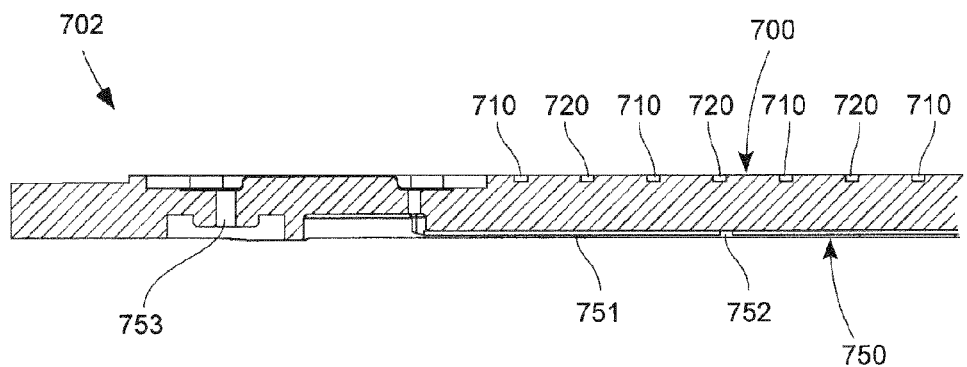
Figure 9:
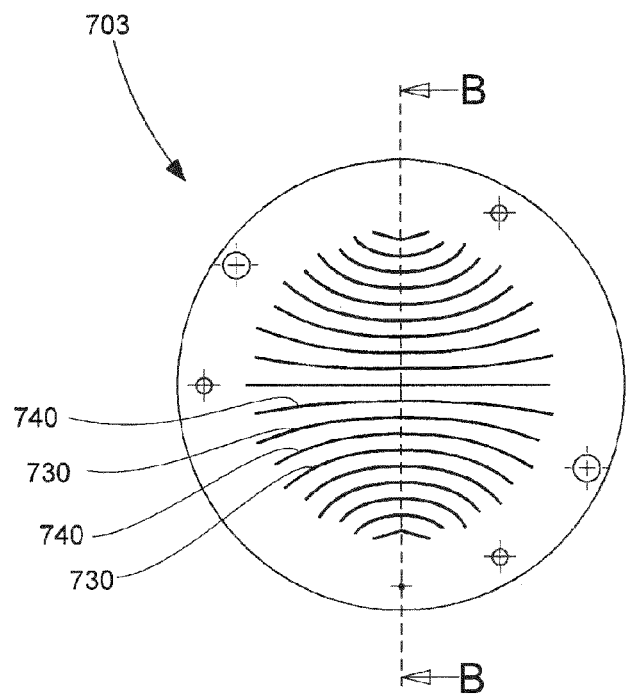
Figure 10:
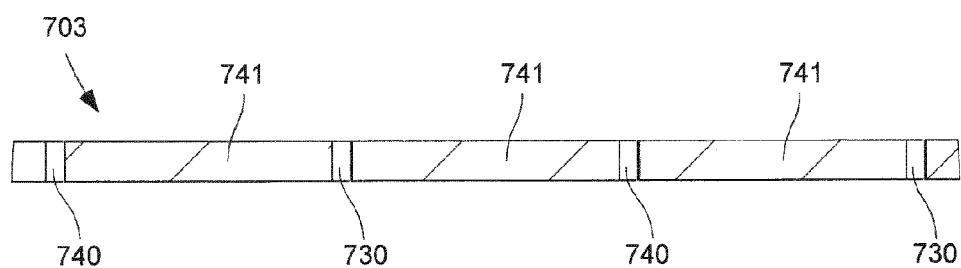

Turning to FIGS. 7-10, an advantageous embodiment of a flow plate is shown that addresses the issue of uneven flow distribution along the direction of the feed and drain channels, as illustrated by the CFD simulation described above with respect to FIGS. 5 and 6. FIGS. 7 and 8 show a channel plate 702 with an inter-digitized flow field 700 layout comprising curved feed and drain channels 710, 720, and FIGS. 9 and 10 show an associated cover plate 703 with a corresponding layout of feed and drain apertures 730, 740.

FIG. 7 shows a top view of the front face of a circular channel plate 702 similar to the channel plate 202 described above with respect to FIG. 2. The channel plate 702 has feed, drain and collection ports 715, 725, 753 arranged on a rim portion, wherein the feed port 715 is connected to a feed manifold 714, and the drain port is connected to a drain manifold 724. The feed and drain manifolds are arranged opposite of each other on the periphery of a circular flow field 700 with inter-digitized feed and drain channels 710, 720. The channel plate 702 differs from the channel plate 202 of FIG. 2 in the layout of the flow field pattern 700, wherein the lateral distance between adjacent feed and drain channels 710, 720 is smaller in a centre portion as compared to a peripheral portion. The distance between adjacent feed and drain channels 710, 720 is a minimum in a middle section of the channels 710, 720, and increases in a direction along the channels from the middle section towards either end. Such a configuration is particularly advantageous in a circularly shaped flow field pattern, but may also be conceived accordingly for other shapes, e.g. polygonal, such as rectangular, square, or hexagonal. In the circular flow field 700 on the channel plate 702, the feed and drain channels 710, 720 are curved with a curvature that increases with an increasing distance of the channels 710, 720 from the centre of the channel plate 702. Advantageously, the channels point radially inward/outward at the outer ends, essentially perpendicular to the feed and drain channels on the circular periphery, wherein the ends are connected by a smoothly curved trace, such as a spline, a circular arc, or an elliptical arc.

The embodiment of the flow plate shown in FIGS. 7-10 is a bipolar separator plate for use in a stacked cell electrolyser. The channel plate 702 is therefore on the rear face provided with a cathode side flow field pattern 750 of collection channels 751, 752, which may e.g. be arranged in a criss-cross pattern as the one described above with reference to FIG. 3. The collection channels 751, 752 are via a peripheral collection manifold connected to a collection port 753 arranged on a rim portion of the channel plate 702. The collection port 753 is adapted to use in a stacked cell configuration analogue to the dual function bipolar separator plate for fuel cells as described in European patent EP 1 726 060 B1.

FIG. 8 shows a cross-sectional detail of the channel plate 702 taken along line A-A in FIG. 7. At the left end a cross-section through the rim portion with collection port 753 is seen. Towards the right, on a top face of the channel plate 702, the feed channels 710 alternate with drain channels 720 to form the inter-digitized pattern. As mentioned above, on a rear face, a cathode side flow field pattern 750 of collection channels 751, 752 is provided, which is connected to the collection port 753.

FIG. 9 shows the cover plate 703 associated with the channel plate 702 described above with reference to FIGS. 7 and 8, wherein the cover plate 703 and the channel plate 702 together form the bipolar separator plate for use in a stacked water electrolyser. The an aperture pattern of alternating feed apertures 730 and drain apertures 740 corresponds to the alternating pattern of feed channels 710 and drain channels 720, respectively. When assembled, the feed apertures 730 in the cover plate 703 are aligned with the underlying feed channels 710 on the front face of the channel plate 702, and the drain apertures 740 are aligned with the underlying drain channels 720. Within the lateral perimeter of the electrolytic cell, the closed portions of the cover plate 703 cover and thereby protect at least the elevated portions of the channel plate 702 between and around the channels 710, 720 as well as the manifolds 714, 724. Advantageously as shown in FIG. 9, on the side of the feed manifold 714, the feed apertures 730 slightly extend beyond the drain apertures 740 to overlap the feed manifold. Further advantageously, on the side of the drain manifold 724, the drain apertures 740 extend beyond the feed apertures 730 to overlap the drain manifold 724.

FIG. 10 shows a cross-sectional detail of the cover plate 703 taken along line B-B in FIG. 9. The through-going feed apertures 730 alternate with through-going drain apertures 740, thereby reflecting the inter-digitized pattern of the feed and drain channels 710, 720 on the channel plate 702. Adjacent feed and drain apertures 730, 740 are separated from each other by closed portions 741.

The invention claimed is:

1. Electrolytic cell for the production of hydrogen from water by electrolysis, the electrolytic cell comprising
   a planar membrane electrode assembly (MEA) with a polymer electrolyte membrane (PEM) sandwiched between an anode and a cathode,
   on the anode side, an anode side fluid distribution medium in contact with the anode, an anode current collector in contact with the anode side fluid distribution medium,
   on the cathode side, a cathode side fluid distribution medium in contact with the cathode, and a cathode current collector in contact with the cathode side fluid distribution medium, wherein
   the anode current collector is a flow plate comprising a channel plate made of a carbon/graphite compound connectable to a water source, wherein a front face of the channel plate is provided with a flow field pattern of open-faced channels for water distribution defined by depressed portions alternating with elevated portions, and a cover plate made of a material that is corrosion resistant in an anodic environment of water electrolysis, wherein the cover plate is arranged parallel on top of the channel plate and in electrical contact with the front face thereof, wherein the cover plate is provided with a pattern of through-going apertures to handle fine distribution of water over an anode surface of an MEA alternating with closed portions, wherein the pattern of through-going apertures is aligned with the depressed portions, and wherein the closed portions cover at least the elevated portions of the channel plate; and
   a water source connected to the channels of the flow plate.

2. Electrolytic cell for the production of hydrogen from water by electrolysis according to claim 1, wherein the flow field pattern on the channel plate is a system of inter-digitized feed and drain channels for water,
   wherein each of the feed channels for water has an upstream end that is connected to at least one feed port for water via at least one feed manifold connectable to a water source, and has a downstream end that terminates on the channel plate,
   wherein each of the drain channels for water has an upstream end that terminates on the channel plate and a downstream end that is connected to at least one drain port for water via at least one drain manifold, and
   wherein the apertures in the cover plate are arranged as an inter-digitized pattern of feed and drain apertures corresponding to the inter-digitized pattern of feed and drain channels.

3. Electrolytic cell for the production of hydrogen from water by electrolysis according to claim 2, wherein the at least one feed manifold and the at least one drain manifold are arranged on opposite portions of the periphery of the channel plate, and wherein the lateral distance between adjacent feed and drain channels in the inter-digitized flow field on the front face of the channel plate is smaller in a centre portion as compared to a peripheral portion of the channel plate.

4. Electrolytic cell for the production of hydrogen from water by electrolysis according to claim 1, wherein the width of the apertures in the cover plate is less than the width of the underlying channels in the channel plate.

5. Electrolytic cell for the production of hydrogen from water by electrolysis according to claim 1, wherein the width of the apertures in the cover plate is less than 0.5 mm, or between 0.1 mm and 0.5 mm.

6. Electrolytic cell for the production of hydrogen from water by electrolysis according to claim 1, wherein the cover plate has a thickness of at least 0.2 mm, or between 0.2 mm and 3 mm, alternatively between 0.3 mm and 1.5 mm, alternatively between 0.5 mm and 1 mm.

7. Electrolytic cell for the production of hydrogen from water by electrolysis according to claim 1, wherein the cover plate is made of stainless steel, titanium, or a titanium alloy.

8. Electrolytic cell for the production of hydrogen from water by electrolysis according to claim 1, wherein the channels on the front face have a depth of between 0.3 mm and 1 mm.

9. Electrolytic cell for the production of hydrogen from water by electrolysis according to claim 1, wherein the channel has at the top plane a width of between 0.3 mm and 3 mm.

10. Electrolytic cell for the production of hydrogen from water by electrolysis according to claim 1, wherein the flow plate is generally circular as seen in a vertical direction.

11. Electrolytic cell according to claim 1, wherein the anode current collector and the cathode current collector are on respective bipolar separator plates.

12. Electrolytic cell according to claim 1, wherein a minimum distance r between the anode and inner surfaces of the channels of the channel plate exceeds 1 mm.

13. Stacked cell electrolyser for the production of hydrogen from water by electrolysis, wherein the electrolyser is formed as a stack of electrolytic cells according to claim 11.

* * * * *